June 26, 1951 M. V. KALFAIAN 2,558,489

COLOR TELEVISION SYSTEM

Filed June 6, 1949 7 Sheets-Sheet 1

INVENTOR.

Megerdich V. Kalfaian

INVENTOR.

Megar V. Kalfaian

INVENTOR.
Meguer V. Kalfaian

June 26, 1951 M. V. KALFAIAN 2,558,489

COLOR TELEVISION SYSTEM

Filed June 6, 1949

7 Sheets-Sheet 4

INVENTOR.

Megerdich V. Kalfaian

INVENTOR.
Meguer V. Kalfaian

INVENTOR.

Megurdich V. Kalfaian

June 26, 1951 M. V. KALFAIAN 2,558,489

COLOR TELEVISION SYSTEM

Filed June 6, 1949 7 Sheets-Sheet 7

INVENTOR.

Magnus V. Kalfaian

Patented June 26, 1951

2,558,489

UNITED STATES PATENT OFFICE 2,558,489

COLOR TELEVISION SYSTEM

Meguer V. Kalfaian, Hollywood, Calif.

Application June 6, 1949, Serial No. 97,412

4 Claims. (Cl. 178—5.2)

This invention relates to color television, and particularly to systems utilizing simultaneous amplitude and phase or frequency modulation for the conveyance of video signals of multiple primary colors, during elemental image scansion periods. Its main object is to provide a multiplex modulation system through which a plurality of video signals of different primary colors can be transmitted simultaneously, without increasing either the frequency bandwidth or the time required, beyond what ordinarily would be required for transmitting only one of said signals over double-sideband transmission system.

A feature of the present invention is to time-divide the carrier wave into elemental envelopes at a frequency rate equal to the highest frequency component contained in any one of the video signals of primary colors, and assign the amplitude and phase of the carrier in these individual envelopes to carry elemental video signals of the different primary colors simultaneously. In a color television system utilizing three primary colors, the amplitude of the individual carrier envelopes is assigned to carry video signals of the first primary color continuously, and phase angle of the carrier in the said envelopes is assigned to carry video signals of the second and third primary colors sequentially. However, ordinary sequential scanning is inherently inefficient, in that, all the available time of image signal transmission is not utilized, due to the characteristics peculiar to color images, when at random elemental intervals one color is absent, or predominates the other. To allow signals of one primary color to be conveyed when signals of the other primary color are absent, I provide a switching system to reverse the signal sequence randomly, at elemental scansion periods, depending on which of the two colors is present, or predominates the other; thus, increasing the total effective number of transmission time element, and render the system practically equivalent to a simultaneous three-color transmission system. In order to distinguish the signals of the second and third primary colors at the receiving end, the video signals of the second primary color is prearranged to advance the phase angle of the carrier, and the signals of the third primary color to retard the phase angle of the carrier. These advancing and retarding carrier phases are made to produce positive and negative video signals at the receiving end; each operating an image reproducing device of the particular color; the device for the first color being operated directly by the signals derived from the amplitude modulation.

Due to the composite modulation involved in the present invention, various inventions having distinct and separate characteristics will be disclosed herein, as they are interrelated to form an exemplary embodiment of the invention. A particular reference is made to my copending application, Serial Number 3,318, filed January 20, 1948. The disclosure of this application reveals a type of phase modulation which eliminates the necessity of producing a reference carrier wave at the receiving end for comparison and detection. This is accomplished by shifting the phase angle of the carrier wave in each time-divided envelope (as mentioned above), in a steady state step, by a difference-angle (representative of intelligence) measurable from a preceding step of phase angle, whereby each preceding step of phase angle represents a reference angle to a succeeding step of phase change. Detection of this type of phase modulation is achieved by comparing the phase of the incoming carrier obtained (after amplitude limitation) from two circuits; one having substantially zero resolution period, and the other having a resolution period equal to one division of the time-divided carrier. To adapt this type of modulation to the present invention, the phase angle of the carrier in each envelope is either advanced or retarded during each elemental scansion period to represent one of the two primary-color video signals.

Reference is also made to my copending application, Serial Number 752,601 filed June 5, 1947, the disclosure of which describes simultaneous amplitude and phase modulation of a time-divided carrier wave, without increasing the frequency bandwidth on either side of the fundamental frequency, beyond the highest frequency component contained in any one of the simultaneous modulating waves. For example, in the case of television, if a maximum number of $3\times10^6$ D. C. components are to be transmitted per second over each of the amplitude and phase modulations independently (totalling $6\times10^6$ D. C. components), the sideband frequencies will be confined within a total bandwidth of 6 megacycles. Sideband frequency restriction of this type is achieved by wave controlling, one instance of which may be referred to a Patent 2,257,795 granted to F. Gray on October 7, 1941. However, to further clarify sideband considerations regarding the composite modulation employed herein, the following analysis of sideband behavior is observed.

In the simple case of pure amplitude modulation, the zero crossings of the carrier wave are equally spaced, and therefore, the carrier represents fundamentally a single frequency. However, in the act of amplitude change, the maxima of the carrier half-cycles shift from normal time positions, which behave as though the carrier half-cycles were changing in time, and possessing additional frequencies. Accordingly, a modulated carrier voltage has essentially two components: one emanating from the carrier without time shift of the maxima, and one emanating from the carrier voltage that experiences these time shifts.

The power derived from the carrier voltage that experiences time shift of the maxima is attributed to the sidebands, since in their absence this voltage is also absent. Hence, if we determine the output of this power, we will determine the power contribution of the sidebands at any given instant.

The carrier voltage that experiences these time shifts may be found by writing the modulation voltage, as:

$$e=(a+b\cos\theta_m)\cos\theta_c \qquad (1)$$

where, $\theta_m$ and $\theta_c$ are the instantaneous phase angles of the sinusoidal modulation envelope and the carrier respectively, while $a$ and $b$ are constants. In general, $b$ is smaller or equal to $a$, and therefore, Equation 1 may be written, as:

$$e=(1+K\cos\theta_m)\cos\theta_c \qquad (2)$$

To find the positive or negative shift of the maxima, Equation 2 may be differentiated and set the derivative equal to zero.

$$\frac{de}{dt}=-a(1+K\cos\theta_m)\sin\theta_c\frac{d\theta_c}{dt}-aK\sin\theta_m\cos\theta_c\frac{d\theta_m}{dt}=0 \qquad (3)$$

$$\frac{d\theta_m}{dt}=2\pi f_m \text{ and } \frac{d\theta_c}{dt}=2\pi f_c$$

Therefore, Equation 3 may be simplified and solved for $\theta_c$, as follows:

$$\tan\theta_c=-(f_mK\sin\theta_m)/f_c(1+K\cos\theta_m) \qquad (4)$$

$$\phi=-\arctan\{(f_m/f_c)(K\sin\theta_m)/(1+K\cos\theta_m)\} \qquad (5)$$

where, $\phi$=sidewise shift of the maxima from normal. By further simplifying Equation 5:

$$\phi=\arctan(Kf_m/f_c) \qquad (6)$$

$$f_m=f_c\tan\phi/K \qquad (7)$$

Equation 7 shows that the term ($f_c\tan\phi/K$) is the added carrier component that experiences time shift of the maxima. Therefore, the fundamental carrier contains plus and minus this component, which contribute to the sidebands.

Since, ($f_c\tan\phi/K$) is equal to the impressed modulating frequency $f_m$, we may determine the power contribution of $P_s$ of this component at any given instant, by first writing the instantaneous voltage and current of $f_m$, as:

$$e_m=KE_m\sin w_mt,\ i_m=KI_m\sin w_mt \qquad (8)$$

Accordingly, the sideband power $P_s$ may be written by multiplying the two terms of current and voltage, as:

$$P_s=KE_mI_m\sin^2 w_mt$$
$$=K\tfrac{1}{2}E_mI_m(1-\cos 2w_mt) \qquad (9)$$

The average value of ($\cos 2w_mt$) is zero, hence, the average value of power is:

$$P_s=\tfrac{1}{2}E_mI_m \qquad (10)$$

Equation 10 agrees with the average value of power generally given for sidebands. However, Equation 9 shows that the frequency associated with the power arising from the sidebands is exactly twice the frequency of the impressed modulating voltage. Furthermore, it shows that the sideband power is maximum at the steepest part of the modulation envelope. Accordingly, the phase relations of the carrier and sideband power variations may be shown graphically as in Fig. 3, wherein, $a$ illustrates the condition existing in 100% modulation, and $b$ in 50% modulation.

It will be noted that the power of the carrier $P_c$ varies from a fixed reference level equal to 1, whereas, the sideband power $P_s$ varies from a fixed level equal to 0. In other words, the sideband power is 100% modulated at a frequency $2w_m$ regardless of the modulation ratio K. This shows that, in the ideal simple case of unity modulation, each envelope may be separated from its boundaries of substantially zero level and transmitted as an independent carrier unit without expanding the spectral width outside the specified regions. Thus, these units may be transmitted by a controlled method: (1) continuously, as in Fig. 7, wherein the magnitude of the envelope remains constant, but the phase angle in each envelope shifts in steady state step by sampling method; (2) as in Fig. 8, wherein, the time interval T between the envelopes may be any length of time; and (3) as in Fig. 10, wherein, each envelope of the carrier carries simultaneous amplitude and phase representations of elemental informations. Fig. 6 shows another case, wherein, the frequency in each envelope is varied in steady state steps. In this case however, steps of sideband frequencies will extend beyond the normal bandwidth, and the method of modulation may be employed where bandwidth expansion is not objectionable. Figs. 4 and 5 show waveshapes of a controlled-modulated carrier wave, wherein, only amplitude modulation is employed.

Briefly therefore, to obtain the results regarding the present invention, the following steps are provided: to time-divide the carrier wave into elemental envelopes (of the character mentioned above) at a frequency rate equal to the highest frequency component contained in any one of the video signals of the first; second and third primary colors, to derive first; second and third steady state electrical quantities from the said video signals in phase with the said envelopes, to modulate the amplitude of the envelopes by the first quantities continuously, to advance the carrier phase of every second envelope by representative angles corresponding to the statistical magnitudes of the second quantities, to retard the carrier phase of every other envelope by representative angles corresponding to the statistical magnitudes of the third quantities, and to switch the sequence of the second and third modulations randomly at elemental image scansion periods, depending on which of the two last mentioned signals is present or predominates the other, whereby greater portion of the total effective time allowed for conveying the second and third signals is utilized.

With the brief foregoing and other advantages in view the invention will be more fully set forth in the following detailed description of an exemplary system when taken in connection with the accompanying drawings, wherein, Figs. 1 and 2 are graph and waveforms indicating frequency ranges involved in the type of modulation employed herein; Figs. 3$a$ and $b$ are graphs showing power variation of a modulated carrier wave; and Figs. 4–10 are various waveforms of a composite modulated carrier wave.

Figs. 11 and 12 illustrate circuit arrangements for producing periodic cosinusoidal functions.

Figs. 13 and 13*a* are sampling circuits in accordance with the invention.

Figs. 14*a–e* are various waveforms used in describing the operation of the circuit arrangements of Figs. 13 and 13*a*.

*Gate and modulator tube*

Figure 1:
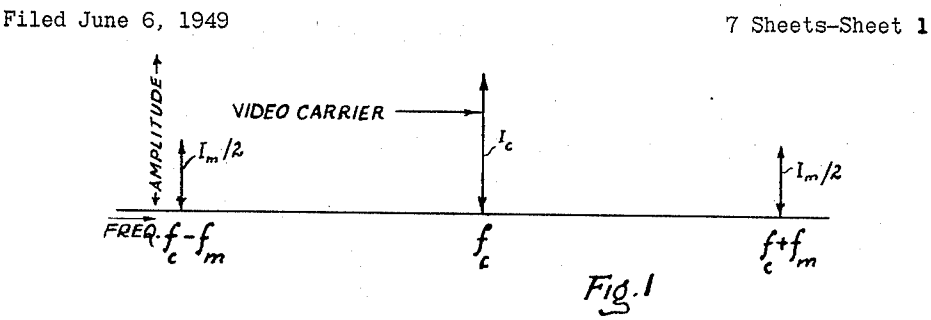
Figure 2:
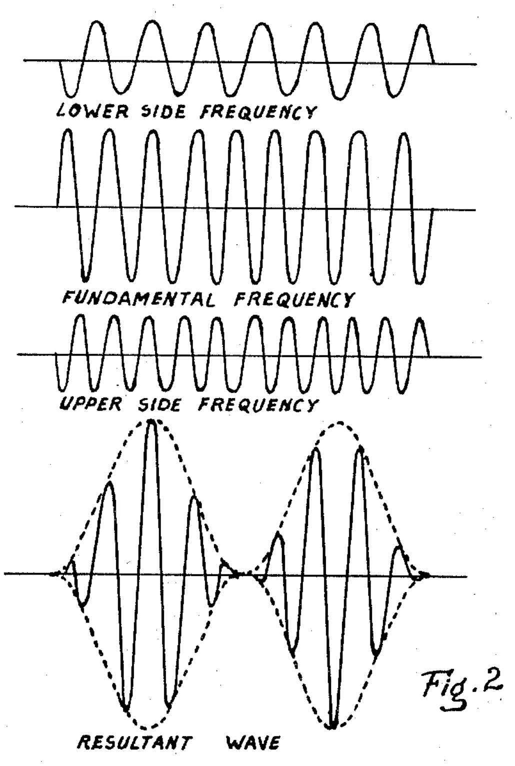
Figure 3:
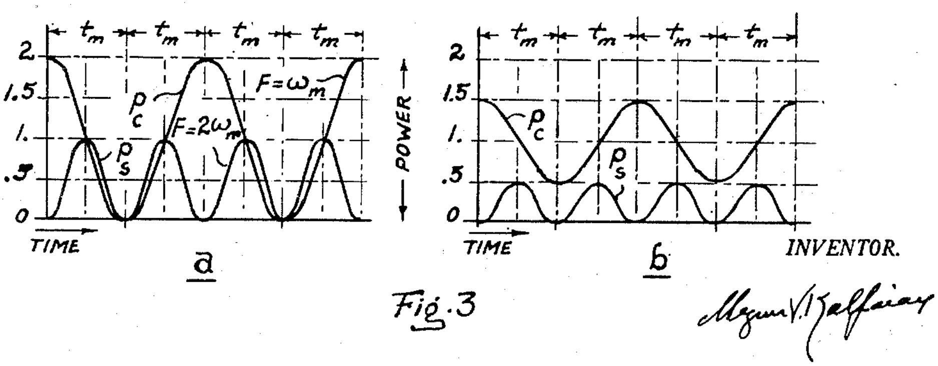
Figures 4, 5, 6, 7:
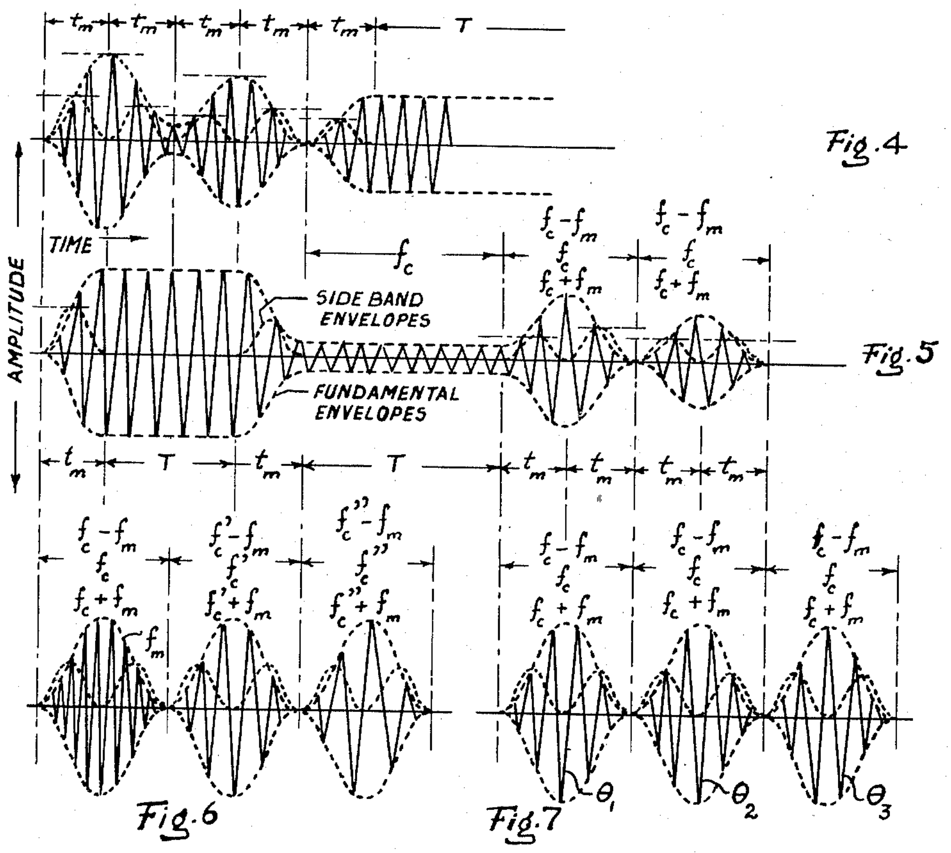
Figure 9:
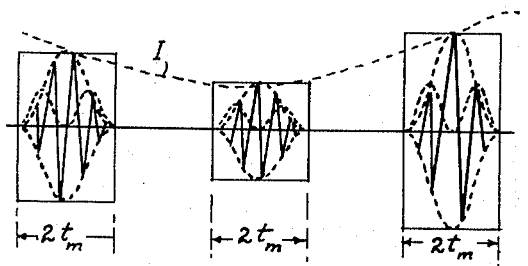
Figure 10:
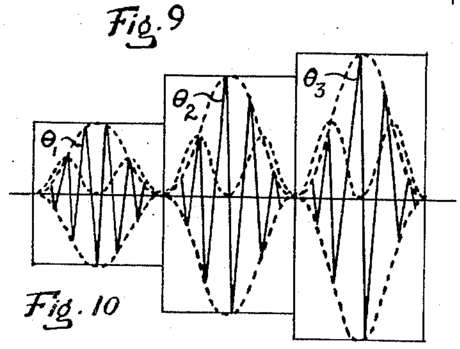
Figure 8:
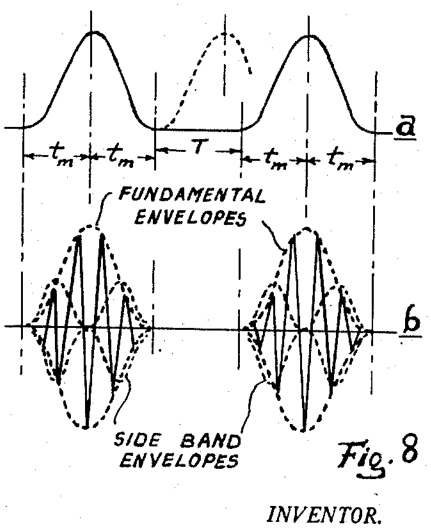
Figure 11:
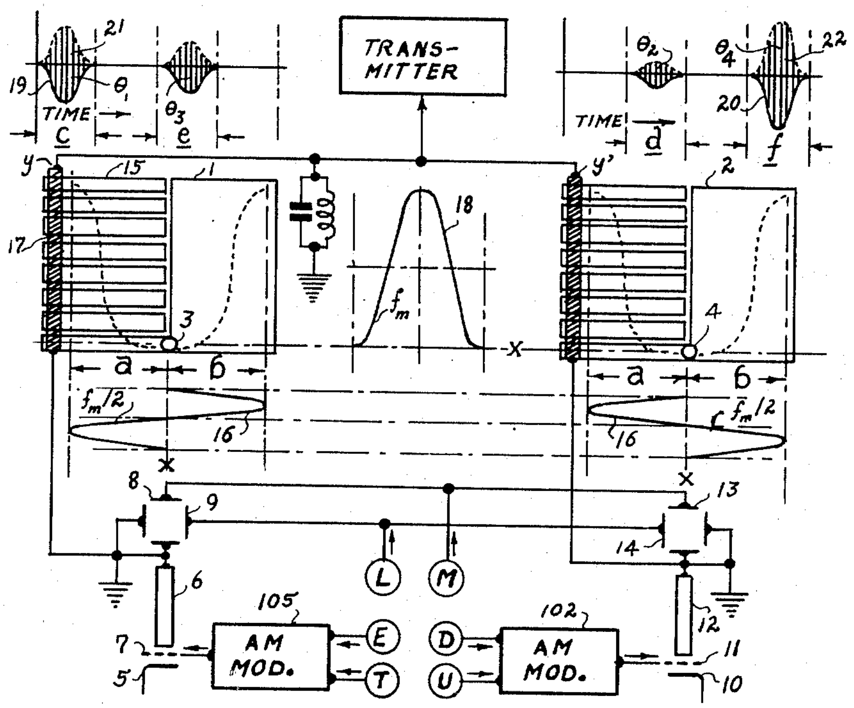

Special waveshaping modulator tubes adaptable to the present system had been described in my copending patent application Serial Number 793,145 filed December 22, 1947. However, to make this specification complete, part description of the waveshaping tube is given in the following: Fig. 11 shows two targets 1 and 2, positioned perpendicularly to the flow of electron beams 3 and 4. The electron beam 3 is produced by the emitting cathode 5, and it is focused upon the target 1, by the focusing gun 6. The intensity of the said beam is controlled by the control element 7, and the beam 3 is swept across target 1, by the electrostatic deflecting plates, namely, vertical 8 and horizontal 9. The elements associated with the target 2 are similar in all respects, and are numbered as, cathode 10, intensity control element 11, gun 12, vertical deflecting plates 13, and horizontal deflecting plates 14. The targets 1 and 2 are similar both in construction and operation, and target 1 may be taken as typical example to explain the operation of the system.

The mosaic target 1 is divided into two sections, as indicated by the letters *a* and *b*. The section *b* consists of a uniform conductive surface in the plane perpendicular to the flow of the beam 3 and is electrically grounded with respect to the emitting cathode 5, in order to short-circuit the electron current of the beam 3. The section *a* consists of a plurality of conductive strips 15, parallel to and closely adjacent to each other, and positioned such that, the surfaces of the said strips are perpendicular to the axis of the beam 3. The orientation of the target is also such that, the elemental strips 15 are parallel to the direction in which the beam 3 is to be deflected by the control wave 16. The elemental strips 15 are made to have mutual conductance of some predetermined values, by the linear resistance element 17, connected to each step as illustrated. One end of the resistance connects to the conductive section *b*, by the elemental strip at the extreme lower end, as illustrated, whereby the electron stream of the beam 3 is effectively short-circuited to ground when swept across the lower end of the section *a*, and impeded gradually and linearly as the beam is swept across the upper section of *a*. Thus, when the beam 3 is positioned upon any part of section *b*, or, at the extreme lower end of section *a*, the output voltage at the terminal *y* is zero. But when the beam is swept vertically across section *a*, the mutual impedances of the said parallel strips present to the beam effective impedances, which at any one position is a function of the vertical displacement of the beam from the said extreme lower end. Accordingly, when the beam 3 is swept vertically across section *a*, sinusoidally, such as by the wave 18, the output voltage at *y*, will be sinusoidal.

The frequency of control wave 16 is adjusted equal to half the frequency of sinusoidal wave 18, and their *x* axes are adjusted to have in-phase relations. Thus, when the wave 16 sweeps the beam 3, horizontally across section *b*, the output of wave 18 at terminal *y* is cancelled to ground. But during the alternate half cycle interval of wave 16, when the beam 3 is swept across section *a*, the wave 18 appears at the terminal *y*, as a periodic cosinusoidal function, such as shown above the targets 1 and 2 by the solid lines 19 and 20; the functions 20 being produced in alternate periods by the target 2.

Now assume that the intensities of the electron beams 3 and 4 are modulated by a high frequency carrier wave applied upon the control elements 7 and 11. The high frequency wave will appear across the output terminals *y* and *y'*, modulated by the cosinusoidal functions, such as shown by the waves 21 and 22. Further, if the magnitudes of these carrier waves at the control elements 7 and 11, are independently modulated in steady state steps (to be explained further), the peak magnitude of each envelope will be different, as shown by the output envelopes at areas *c*, *e*, and *d*, *f*. Still further, if the carriers at 7 and 11 are shifted in phase while the beams 3 and 4 are in their said short-circuited periods, and the said shifted phases remain in steady states thereon, the phase in each envelope will be different in accordance with the type of waves as explained in the foregoing.

Figure 12:
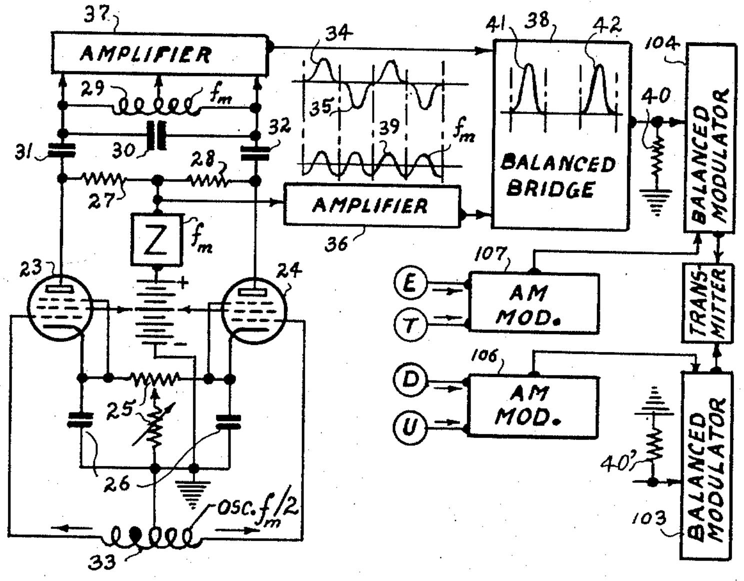

A further modification of the cosinusoidal function generator is shown in Fig. 12. This circuit is essentially a balanced modulator, comprising balanced tubes 23, 24, cathode bias circuit comprising resistance 25 and bypass condensers 26, balanced plate circuit impedances 27, 28, a resonant circuit comprising coil 29 and condenser 30, coupled to the impedances 27, 28, by the condensers 31 and 32, and a sinusoidal voltage of frequency $f_m/2$, from across coil 33, applied upon the control grids of the tubes 23 and 24.

The negative bias upon the control grids of tubes 23 and 24 is adjusted at such point that, the variation of output voltage across the plate circuit impedances Z, and 27, 28, are proportional to the square of the variation of the input voltage across coil 33; changing each half-cycle wave into a cosinusoidal function, from the relation: $\sin^2 t = \frac{1}{2}(1 - \cos 2t)$. If this bias is correctly adjusted and the tubes are balanced, the output voltage across the single ended plate impedance Z, shown in block diagram, will be exactly twice the frequency with respect to the applied input voltage across coil 33. However, the output voltage across balanced impedances 27 and 28, will have the shape of cosinusoidal functions alternately changing their polarities, as shown by the waves, 34 and 35. These latter waves also represent twice the input frequency that is applied from across coil 33. Accordingly, if the voltage wave across 27 and 28 is coupled to a resonant circuit comprising coil 29 and condenser 30, tuned to the frequency $f_m$, the voltage across the tuned circuit will be of similar shape, which may be further amplified by 37.

The output of amplifier 37 is applied to one leg of a balancing circuit 38, and to the other leg is applied the sinusoidal wave 39, from impedance Z, and amplifier 36. If both waves are of equal magnitudes, it is obvious that during the periods of waves 34, both waves will be added, and during the periods 35, both waves will cancel each other, with the result that, the output voltage across impedance 40 will be periodic cosinusoidal functions as shown by the waves 41, 42, in the block 38.

*Sampling circuit*

Sampling circuit details for monotone television transmission had been shown in my patent copending application Serial No. 752,601, filed June 5, 1947, and the schematic presented herein is a modification for three color transmission.

Figure 13:
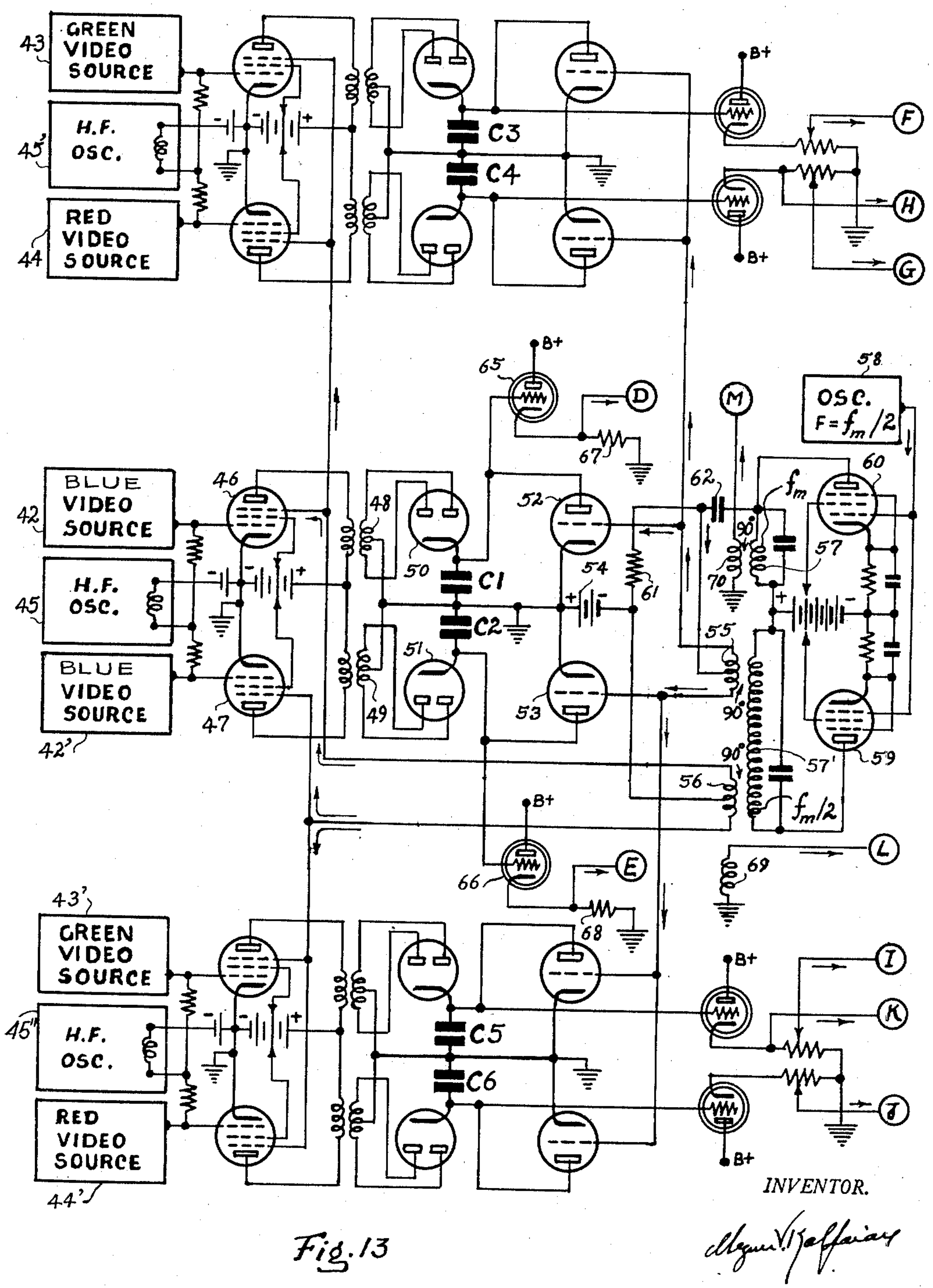

In Fig. 13, there are shown three independent video signal sources, each delivering signal components of a primary color of the original color image to be transmitted. The rectangles 42 and 42′ are represented as originating from a single video source of the primary color, blue; these rectangles being repeated in the drawing to simplify wiring connections. Similarly, the rectangles 43 and 43′ are repeated in the drawing, both of which represent a single video source of the primary color, green, and the rectangles 44 and 44′, both of which represent a single source of the primary color, red. The rectangles 45, 45′ and 45″ are drawn as independent high frequency sources, and they may either be independent, or, a single source connecting to all of the said color image sources.

Making reference to the blue color video signals, the high frequency wave of any suitable frequency (higher than the highest video frequencies) is modulated by the blue video signals in the vacuum tubes 46 and 47. Accordingly, the modulated high frequency wave appears independently in the plate tank circuits of tubes 46 and 47, namely, across the transformers 48 and 49. These modulated waves are further rectified separately by the rectifier tubes 50 and 51 respectively. The rectified voltages through the tubes 50 and 51 are charged separately in condensers C1 and C2, which complete the cathode circuits of said tubes. These condensers are normally free of load impedances, and therefore, charge to the incident peak magnitudes of the modulated oscillation during alternate sampling periods, and retain their stored quantities without decay during the other alternate transmission periods. The discharge of these condensers is achieved periodically in alternate sequence by the grid controlled vacuum tubes 52 and 53, which are normally biased to plate current cut-off by the bias supply 54. The function is that, while these tubes are rendered non-conductive, they act as high impedances across the condensers without disturbing their stored quantities. But when the negative bias 54 is raised near cathode potential in alternate time intervals, the tubes 52 and 53 become plate current conductive and discharge their previously stored quantities in corresponding alternate periods.

The alternate sampling of the blue video signals across condensers C1 and C2 is obtained by operating the vacuum tubes 52, 53 and 46, 47 in a predetermined sequence under control waves; the latter tubes being normally biased to plate current cut-off by the bias source 54. The control waves are obtained from generator 58, which normally oscillates at a switching frequency $f_m/2$; equal half the frequency of the highest number of elemental video components to be transmitted per second. The output oscillatory voltage of 58 is applied upon the control grids of vacuum tubes 59 and 60. The vacuum tube 60 acts as a frequency doubler, and its plate tank coil 57 is tuned to twice the input frequency, while tube 59 acts as buffer amplifier, and its plate tank coil 57′ is tuned to the input frequency $f_m/2$.

The voltage of oscillatory wave $f_m/2$ from across coil 57′ is inductively induced upon the secondary coil 55, and applied therefrom upon the control grids of vacuum tubes 52 and 53 in alternate polarity by push-pull connection, while the voltage of oscillatory wave $f_m$ is applied upon the grids of said tubes in parallel from across resistance 61 (coupled to coil 57 by condenser 62) in series with each half section of coil 55 through its center tap, as shown in the drawing. The potential magnitudes across resistance 61 and coil 55, as well as their phase differences are so adjusted that, while the added simultaneous first positive half cycle of the wave $f_m$ across resistance 61 and the first positive quarter cycle of $f_m/2$ across coil 55 drive the control grid of one condenser-discharging tube (for example tube 52) above negative cut-off bias for operation, the first negative quarter cycle of wave $f_m/2$ across coil 55 subtracts from the positive half cycle of the wave $f_m$ across the grid of the other condenser-discharging tube (for example tube 53) to hold it inoperative. Similarly, the magnitude and phase of the voltage across coil 56 is so adjusted that, when the positive half cycle of $f_m/2$ from across coil 55 is applied upon the control grid of tube 52 for operation during the first quarter cycle period, the voltage of positive half cycle from across coil 56 is applied upon the vacuum tube 46 for simultaneous operation, whereby the modulated HF-oscillation passes therethrough and an incident magnitude of the blue video signal is stored in the condenser C1. This process reverses in operation when the voltage of wave $f_m/2$ reverses in polarity, i. e., vacuum tubes 46, 52 become non-conductive, and vacuum tubes 47, 53 become conductive. Thus it is seen that, during one half cycle period of the wave $f_m/2$, condenser C1 is discharged and recharged to an incident magnitude of the video signal, while a previous charge in condenser C2 remains in a steady state value, and vice versa.

Figure 14:
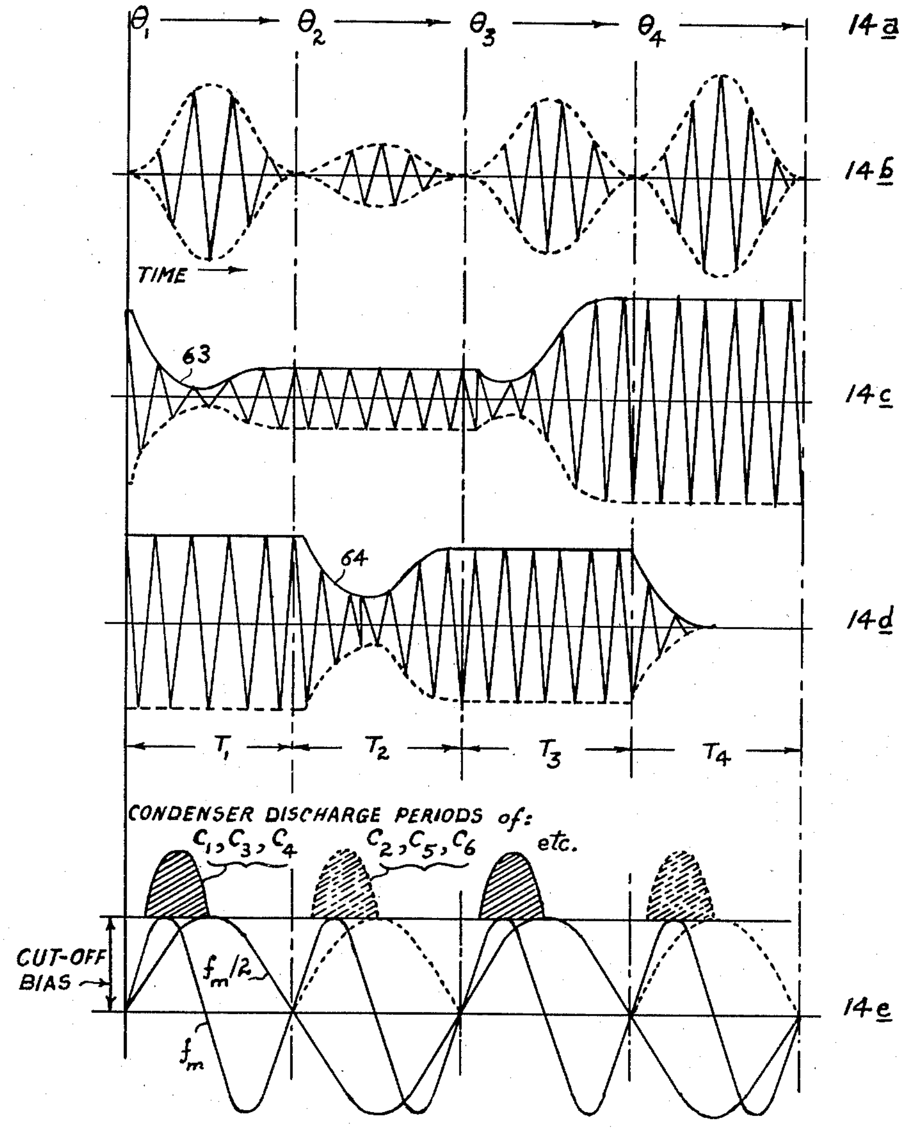

The time intervals of the above given operation, as well as the waveforms involved in each operation are graphically illustrated in Fig. 14. In the section 14*e*, the phase relations of the waves $f_m$ and $f_m/2$ with respect to each other are shown in the time areas $T_1$ and $T_2$. Assuming that the positive half cycle of wave $f_m/2$ is applied upon the control grid of vacuum tube 52 during the area $T_1$, the peak magnitude of this voltage drives the normal bias upon the said grid just short of plate current conductance. However, the addition of the positive half cycle of wave $f_m$, further drives the said tube to plate current conductance during the shaded area. Accordingly, during the time area $T_1$, the condenser C1 is discharged and recharged again, as shown by the solid lines 63, at section 14*c*. During the following period $T_2$, the condenser C2 becomes discharged and recharged in a similar manner, an approximate wave shape of which is shown at section 14*d*, by the solid lines 64.

The condensers C1 and C2 in Fig. 13 are direct coupled to cathode follower tubes 65 and 66 respectively, and the outputs are taken from their cathode circuit resistances 67 and 68, at terminal points D and E. The elemental video signals of the green and red colors are sequentially sampled with respect to the continuous video signals of the blue color, e. g., during one sampling period of the signals of blue color, the sampling of the signals of green color is performed, and during the other sampling period of the signals of blue color, the sampling of the signals of red color is performed. However, in accordance with the invention, during each of the said alternate sampling periods of the signals of blue color, both signals of green and red colors are simultaneously and independently sampled, for random switching of one with the other, the system of which will be explained further. Accordingly, the signals of green and red video sources at rectangles 43 and 44 are sampled simultaneously by the condensers C3 and C4 during the sampling periods of condenser C1, and the signals of green and red video sources at rectangles 43′ and 44′ are sampled simultaneously by the condensers C5 and C6 during the sampling periods of condenser C2. The functional operations of the circuits associated with the condensers C3, C4 and C5, C6 are similar to the circuits associated with the condensers C1, C2, and the circuit diagram is made clear to understand their operations without further explanation, and further numeral designations. The outputs of the condensers C3 and C4 are obtained from the terminal points F, G and H, and outputs of the condensers C5 and C6 are obtained from the terminal points I, J and K.

Figure 13A:
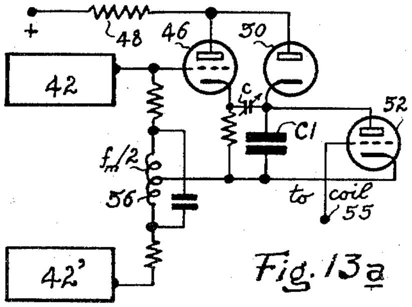

It had been shown in Fig. 13, that the condensers C1—C6 inclusive are charged to incident magnitudes of the modulating signals, by way of the high frequency oscillation from sources 45, 45′ and 45″. However, the high frequency oscillation may be dispensed with, and the circuit in Fig. 13*a* may be employed. Charging of one condenser is in the same manner as any of the condensers C1—C6, therefore, condenser C1 and its associated circuit components are shown in Fig. 13*a*, to explain its operation. Accordingly, the numeral indications are also repeated for convenience.

Video signals (in negative direction) from the source 42, in series with the switching wave $f_m/2$ from across coil 56 are applied upon the control grid of vacuum tube 46. The magnitude of the wave $f_m/2$ is adjusted equal to the highest (or higher) magnitude of the video signals, so that, at each sampling period the negative peak of the wave $f_m/2$ acts as a reference zero signal level for the video signals. Thus, when the wave $f_m/2$ is at its negative slope, the voltage across plate resistance 48 goes positive and the condenser C1 charges proportionally through the rectifier 50, to the peak of the said negative slope, plus the addition of the negative video signal. When the wave $f_m/2$ subsides to zero magnitude and alternates on to the positive slope, the voltage across plate resistance 48 becomes less positive than the charged voltage across C1. However, because of the large magnitude of the wave $f_m/2$, the video signal alone cannot drive the voltage across 48 more positive at this point to disturb the sampled voltage across C1. Accordingly, during the negative slope of the wave $f_m/2$ across coil 56, the condenser samples the video signal, and remains in a steady state during the positive slope of the said wave. The vacuum tube 52 discharges condenser C1 in a similar fashion as explained by way of the schematic in Fig. 13.

The circuit arrangement of the tube 46 is chosen as a cathode follower, and the effects of internal plate to cathode capacity of the rectifier tube 50 is cancelled out by the trimmer capacity *c*. However, if the ratio of capacities of C1 and the internal plate to cathode capacity of tube 50 is chosen to be high, the trimmer *c* will not be necessary. Accordingly, the tube 46 may be employed as an amplifier.

*Block diagram of phase modulators*

The type of phase modulation employed herein had been previously disclosed in my patent copending application Serial No. 3,318, filed January 20, 1948, and reference may be made to it.

Figure 15:
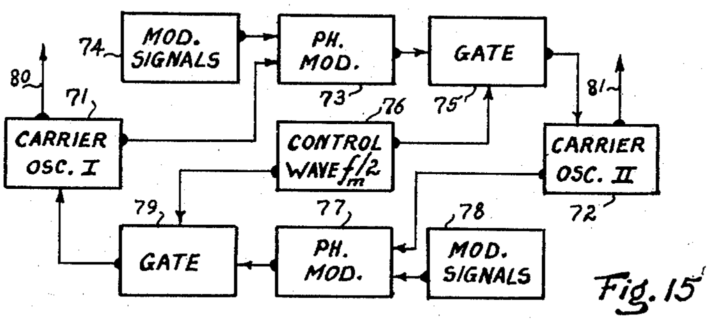

Fig. 15 shows a block diagram of a phase modulator, wherein the phase of the carrier wave is caused to shift in two independent channels alternately in continual steady state steps. The system comprises essentially two oscillators of the same carrier frequency, each controlling the other's phase angle in addition to proportional phase angles corresponding to those of the incident magnitudes of the modulating signals.

The rectangles 71 and 72 are two independent oscillators of the same carrier frequency, equal to, or lower than the final carrier frequency, which may be obtained by frequency multiplication. The phase of the oscillatory output of 71 is shifted in the phase modulator circuit 73, by the modulating signals obtained from 74. The phase modulated oscillatory wave in 73 is passed through the gate 75, and applied upon the carrier oscillator 72 to forcefully shift its phase to an in-phase relation. However, the gate 75 is operated periodically by the control (switching) wave $f_m/2$, produced in 76. Similarly, the phase angle of the carrier oscillation obtained from 72 is shifted in the phase modulator circuit 77 by the modulating signals 78, which may be similar to 74, and passed through the gate 79 periodically to forcefully shift the phase of the oscillations in 71. Accordingly, during one positive half cycle period of the control wave 76, the gate 75 is operated, and the incident phase angle of the oscillations in 71 at the time, plus the further phase shift effected by the modulating wave 74 in the modulator 73, is applied upon the oscillation in 72 to force it into an in-phase relation, while at the same time the gate 79 is rendered inoperative to allow the carrier wave in 71 to oscillate in a steady state condition, and vice versa. The periodic steady state phase shifted carrier oscillations are then taken from the points 80 and 81 for the final composite modulations in accordance with the invention.

Figure 17:
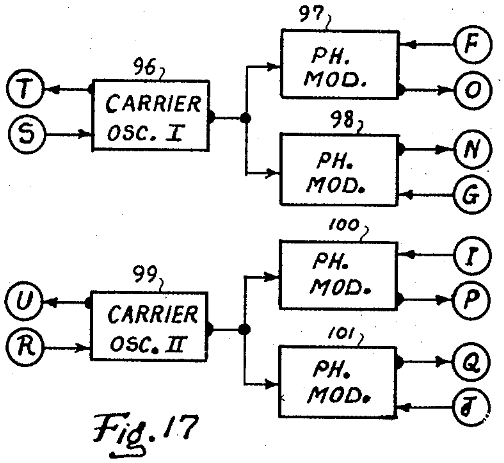
Figs. 15 and 17 are block diagrams of phase modulators in accordance with the invention.

These steady state phase shifted oscillations may also be taken from the phase modulators 73 and 77. In such case, the rectangles 74 and 78 are cancelled and the carrier oscillations I and II are phase modulated in the rectangles 73 and 77 by the sampled voltages obtained from terminal posts D and E (in Fig. 13) respectively. Fig. 17 shows an arrangement wherein the carrier oscillation I from 96 is phase modulated in 97 and 98 by the green and red video samples at terminal posts F, G, and the carrier oscillation II from 99 is phase modulated in 100 and 101 by the green and red samples at terminal posts I and J, obtained from their respective posts in Fig. 11.

*Cathode ray switch*

Figure 16:
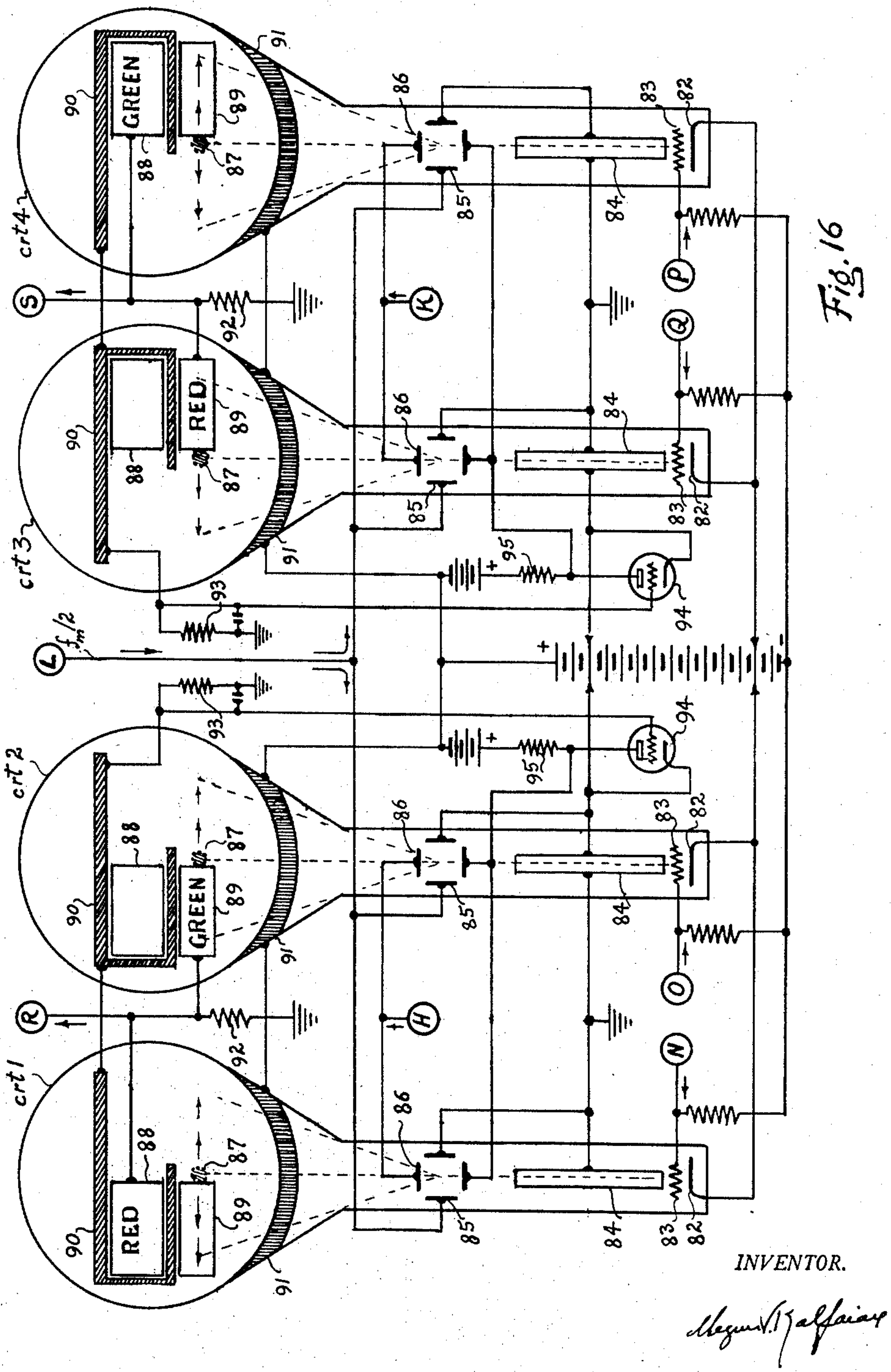
Fig. 16 is a switching system utilizing cathode-ray beams in accordance with the invention.

In Fig. 16, the switching system consists of four signal generating cathode ray tubes divided into two pairs, one pair being mainly operated by the D. C. components of the green color, and the other pair being mainly operated by the D. C. components of the red color. All four of the said tubes are alike in characteristics. Therefore, most of the numeral indications are repeated in the drawing, except in designating the particular tubes, which are marked *crt1*, *crt2*, *crt3*, and *crt4*. Accordingly, the following numeral indications of the elements may be referred to the tubes *crt1*—*crt4*, respectively, comprising electron emitting cathode 82, electron intensity control element 83, electron gun 84, electrostatic horizontal deflecting plates 85, electrostatic vertical deflecting plates 86, electron beam 87, two electrically insulated targets 88 and 89 in the path of the said beam, beam positioning control target 90 in the path of the said beam, and a secondarily emitted electron collector 91. The first pair consisting of tubes *crt1*, and *crt2*, operate in the same manner as the other pair consisting of tubes *crt3*, and *crt4*, and the first pair may be taken as a typical example to explain the operation of the system.

The control wave $f_m/2$ at the terminal post L is applied upon the horizontal deflecting plates 85, which periodically drives the beams 87 off and onto either one of the targets 88 and 89, depending upon the vertical height of the beams at the given intervals. The vertical heights of the beams 87 are simultaneously controlled at the terminal post H, by the elemental D. C. components of the red color, as had been described by the schematic in Fig. 13.

The phase of the control wave $f_m/2$ at the terminal post H is so adjusted that, while the beams 87 travel toward to the right from their normal positions as illustrated, the condensers C3 and C4 in Fig. 13 are in their time intervals of discharging and recharging, and while the said beams travel toward to the left, the charges in the said condensers remain unchanged. Accordingly, when the color red video signal at the terminal H, in Fig. 16, is above a minimum predetermined magnitude, the beam 87 of tube *crt1*, will impinge upon the target 88, thereby causing a signal voltage in the output impedance 92. During this last said interval, the beam 87 of tube *crt2*, will also impinge upon the target 88, but this target is not connected to any outgoing circuit, and therefore it may be eliminated. This target is included in the drawing for the general purpose that, the tubes may be interchanged without necessitating selection of their particular kinds.

Referring again to the video signal at the terminal post H, if the signal is below a minimum predetermined magnitude, the beam 87 of tube *crt2*, impinges upon the target 89, thereby causing a signal voltage in the output impedance 92. Accordingly, it is seen that, when the color red video signal at the terminal post H is above a minimum predetermined magnitude, the signal voltage across the output impedance 92 is received from the tube *crt1*, and when the said video signal is below a minimum predetermined magnitude the voltage signal across the impedance 92 is received from the tube *crt2*, thereby effecting the switching of a first signal in place of a second signal when the second signal is negligible.

However, it may chance at times that, the video signal at the terminal post H may shift the beams 87 to a height separating the targets 88 and 89. In order to shift the beams to either side from these separation points, the control targets 90 are included. The output of these control targets across resistance 93 is direct current amplified by the tube 94, and the amplified voltage across resistance 95 is directly applied upon the vertical deflecting plates 86, of both tubes *crt1*, and *crt2*, simultaneously at such phase that the beam is forced to downward deflection. Hence, the beams are automatically controlled to sweep below the shaded areas of the targets 90. The illustration is not drawn in scale, and the targets 88 and 89 may be structurally closer to each other by overlapping the targets 90. Also, the amplifier tubes 94 may be dispensed with if the voltage across resistance 93 is large enough for direct control of the said beam in vertical direction.

In order to produce the random switching of the elemental viedo components of the green and red colors across the output impedance 92 of *crt1* and *crt2*, the phase modulated carrier oscillation 96 in Fig. 17 by the green and red video signals at terminal posts F and G in the phase modulators 97 and 98, are applied from their output terminal posts N and O upon the control elements 83 of the *crt1* and *crt2*, in Fig. 16, at the terminal posts N and O respectively. Accordingly, the carrier oscillation appears across the output impedance 92, the phase of which either advances or lags depending which one of the targets 88 or 89 the beam impinges upon. Similarly, the phase modulated carrier oscillation of 99 in the phase modulators 100 and 101 in Fig. 17, by the green video components at terminal post I, and by the red video components at terminal post J, are applied from their output terminal posts P and Q, upon the control elements 83 in Fig. 16, of *crt3* and *crt4*, at their respective terminal posts P and Q.

In order to effect a chain of steady state phase angle shifts of the oscillations 96 and 99 in Fig. 17, in a similar manner as had been previously explained and illustrated by the rectangles 71 and 72 in Fig. 15, the output phase modulated oscillatory waves at the terminal posts R and S, in Fig. 16, are applied in alternate periods upon the oscillations I and II in Fig. 17, at their respective terminal posts R and S. The net result being that, while the beams 87 of all four tubes move toward to the left, one of the beams of *crt1*, or, *crt2* impinges upon a target marked Red, Green, and the effective oscillatory wave across the output terminal post R is applied upon the oscillations of 99 in Fig. 17, forcing it to shift to an in-phase relation. This last said phase shift is equal to the steady state phase angle of the oscillation in 96, plus the further phase shift effected in one of the phase modulators 97 and 98, depending upon which of the targets of *crt1* or *crt2* in Fig. 16 had been excited during the said interval. It is obvious therefore, that during this interval the beams 87 of the tubes *crt3* and *crt4*, in Fig. 16 are driven away from the targets, and the oscillation in 96 in Fig. 17, remains in a steady state condition. Accordingly, the output terminal posts R and S in Fig. 16 control the phase of the oscillations in 96 and 99 in Fig. 17, in alternate periods, thereby effecting alternate oscillatory steady state conditions at their output terminal posts T and U.

It is well to note that, the voltages across the output resistances 92 in Fig. 16 are oscillatory. Therefore, these components may be inductive, resonated at the carrier frequency with the proper damping circuits included across them.

In order to cancel out the high frequency oscillations from across resistance 93, the bypass condensers as shown are included. However, these condensers may be considered as stray capacitances of the circuit.

*Interconnection of various circuits for final composite modulation*

Interconnection of input and output terminals of various circuit arrangements shown in Figs.

11, 13, 16 and 17 are properly designated by their respective letterings to indicate the manner in which they cooperate one another to form a complete transmitting system.

Assume that during one half cycle period of the control wave $f_m/2$, the carrier oscillation I in Fig. 17 is phase modulated independently in 97 and 98, by the D. C. components from across C3 and C4 in Fig. 13. The phase shifted oscillatory outputs N and O in Fig. 17 control the intensities of the beams 87 of tubes *crt1* and *crt2*, while during the said period one of the said beams impinges upon a target, effecting one of the phases of oscillations (at input N or O) across the output terminal post R. The switching of the input oscillations N and O depends upon the magnitude of signal arrived during the said period at the terminal post H, representing an incident magnitude of the signal from the red video source 44 in Fig. 13. The output oscillation at the terminal post R, in Fig. 16 is applied upon the carrier oscillation II, in Fig. 17, whereby the newly shifted phase of oscillation II represents an incident magnitude of either the green video source 43, or the red video source 44 in Fig. 13; this depending upon the switching acts of the tubes *crt1* and *crt2*. Further, during said period, the condenser C1 in Fig. 13 is discharged and recharged to an incident magnitude of a blue video signal from the source 42.

The phase shifted oscillation II in Fig. 17 is applied from the output terminal post U, upon the amplitude modulator 102, at its input terminal post U in Fig. 11. Simultaneously, the said newly charged potential across condenser C1 in Fig. 13 from terminal post D is applied upon the modulator circuit 102, in Fig. 11, whereby the phase shifted oscillatory wave at U is simultaneously amplitude modulated. This phase and amplitude modulated wave is applied upon the control element 11, which controls the intensity of the electron beam 4. However, during this period, the polarity of the horizontal deflecting wave 16 is such that, the current effected by the beam 4 is short-circuited to ground from across area *b* of the target 2, and therefore, its signal output is zero.

When the following alternate half-cycle of the control wave $f_m/2$ arrives, the electron beams 87 of both tubes *crt1* and *crt2*, in Fig. 16 are driven away from the targets 88 and 89, thus, oscillation I in the rectangle 99 in Fig. 17 is left free to oscillate at the last induced phase. Similarly, during the last said period, the potential charge in condenser C1 in Fig. 13 remains undisturbed. Hence, both the phase and magnitude of the carrier oscillation I across the control element 11 (which controls the intensity of electron beam 4 in Fig. 11), remains in steady state conditions. Accordingly, the carrier oscillation I appears at the output terminal *y'*, in periodic envelopes at areas *d, f*, etc.; the peak magnitudes of the said envelopes corresponding proportionally to those of elemental D. C. components from the blue video source 42 in Fig. 13, and the phase angles $\theta_2$, $\theta_4$, etc. of the carrier oscillation I in Fig. 17, representing proportionate incident magnitudes corresponding to those of elemental D. C. components from either one of the green video source 43, or, the red video source 44.

In the succeeding alternate half cycle periods of the said control wave $f_m/2$, the operation of the system alternates in the last explained manner, and the carrier oscillation II appears at the terminal *y*, in periodic envelopes at areas *c, e*, etc.; the peak magnitudes of the said envelopes corresponding proportionally to those of elemental D. C. components from the blue video source 42' in Fig. 13, and the phase angles $\theta_1$, $\theta_3$, etc. of the carrier oscillation I in Fig. 17, representing proportionate incident magnitudes corresponding to those of elemental D. C. components from either one of the green video source 43', or, the video source 44'.

In the event that the circuit in Fig. 12 is employed to produce the necessary periodic cosinusoidal functions, the output cosinusoidal functions from across impedance 40 are applied upon the balanced amplitude modulator 104, wherein the carrier wave received from the terminal post T is normally suppressed. For continuous operation, the output waves 34, 35 etc. from amplifier 37 are balanced in a second balanced bridge, similar to 38, and in such phase that the periodic wave functions 34 are cancelled out. The produced periodic functions 35 are then applied upon the balanced amplitude modulator 103 from across 40', in a similar preceding manner; the blocks 106 and 107 representing the blocks 105 and 102 in Fig. 11.

*Phase discriminator circuit*

Figure 18:
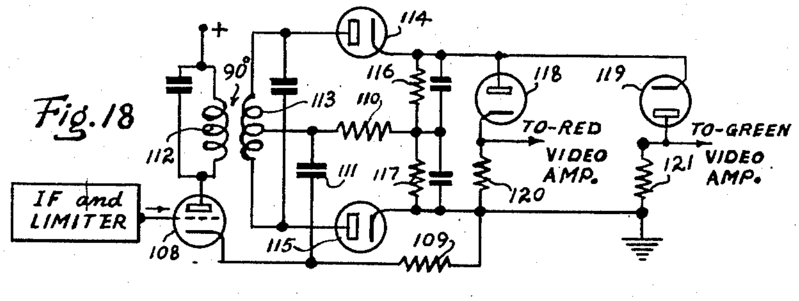
Fig. 18 is a phase discriminator detector in accordance with the invention.

Fig. 18 shows a phase discriminator circuit, comprising a grid controlled tube 108, a cathode circuit impedance 109 coupled to impedance 110 through condenser 111, plate circuit transformer comprising coils 112 and 113, rectifiers 114 and 115, and output resistances 120 and 121.

The cathode circuit impedance 109 is chosen to be resistive, so that the voltage across it is in phase with the shifting phases of the input I. F. wave at the grid of the tube 108, although heavily damped reactive circuit may also be employed. However, the Q of the plate circuit impedance 112 is so adjusted that, the in-phase resolution time is equal to one envelope period. The phase angle of the voltage coils 112 and 113 is normally adjusted to be 90 degrees. Therefore, each time the phase angle of the input I. F. changes, there will be a sudden phase difference between the voltages in resistance 109 and coil 113, with a resultant signal across resistances 116 and 117; the polarity depending upon whether the said phase difference is leading or lagging. Since the advancing and retarding phase differences represent either green or red video signals, the voltages across 116 and 117 are further rectified by 118 and 119, the outputs across 120 and 121, of which are independently amplified to operate image reproducing devices of known types in their respective colors. If the input vacuum tubes of these amplifiers are normally biased to non-conductance, the diodes 118 and 119 may be dispensed with, so that the input tubes operate only by the signals having positive polarity.

It will be noted that the video amplifiers may be adjusted to have response only at the highest frequency of D. C. video components, which is equal to the number of envelopes transmitted per second.

I wish to be understood that I do not limit my invention to the details as shown and described since various modifications coming within the scope of the appended claims, will suggest themselves to a person skilled in the art. For example, switching of the color sequence may be achieved by circuit arrangements other than the cathode ray devices shown, without departing from the characteristics of the invention.

I claim:

1. In color television system where amplitude modulation of the carrier wave is assigned to convey video signals of a first primary color continuously; phase or frequency modulation of the carrier to convey video signals of second and third primary colors sequentially, the method of utilizing greater portion of the total effective time devoted to the conveyance of video signals of the second and third primary colors by the following steps: time dividing the carrier wave into elemental envelopes at a frequency rate equal to the highest frequency component contained in any one of the video signals of first; second and third primary colors, amplitude modulating the said carrier envelopes by video signals of the first primary color, advancing the phase of the carrier in every second envelope by representative angles corresponding to the statistical magnitudes of video signals of the second primary color, retarding the phase of the carrier in every other envelope by representative angles corresponding to the statistical magnitudes of video signals of the third primary color, and switching the sequence of the second and third primary-color modulations randomly at elemental scansion periods depending on which of the two signals is present or predominates the other, whereby greater portion of the total effective time devoted to the conveyance of video signals of the second and third primary colors is utilized.

2. As set forth in claim 1, which includes the steps of transmitting said composite modulated carrier envelopes; receiving same, and deriving separate video signals from the said amplitude; phase (retarding); phase (advancing) modulated carrier envelopes to operate appropriate color image producing apparatus for the final reproduction of the original color image.

3. In color television where amplitude modulation of the carrier wave is assigned to convey video signals of a first primary color continuously; phase or frequency modulation of the carrier to convey video signals of second and third primary colors sequentially, the system of utilizing greater portion of the total effective time devoted to the conveyance of video signals of the second and third primary colors which comprises: means to time-divide the carrier wave into elemental envelopes at a frequency rate equal to the highest frequency component contained in any one of the video signals of first; second and third primary colors, means to amplitude modulate the said carrier envelopes by video signals of the first primary color, means to advance the phase of the carrier in every second envelope by representative angles corresponding to the statistical magnitudes of video signals of the second primary color, means to retard the phase angle of the carrier in every other envelope by representative angles corresponding to the statistical magnitudes of video signals of the third primary color, and means to switch the sequence of the second and third primary-color modulations randomly at elemental scansion periods depending on which of the two signals is present or predominates the other of the character described.

4. As set forth in claim 3, which includes the following: means to transmit the said composite modulated carrier envelopes; means to receive same, and means to derive separate video signals from the said amplitude; phase (retarding); phase (advancing) modulated carrier envelopes to operate appropriate color image producing apparatus for the final reproduction of the original color image.

MEGUER V. KALFAIAN.

REFERENCES CITED

The following references are of record in the file of this patent:

UNITED STATES PATENTS

| Number | Name | Date |
|---|---|---|
| 2,272,638 | Hardy | Feb. 10, 1942 |
| 2,333,969 | Alexanderson | Nov. 9, 1943 |
| 2,389,646 | Sleeper | Nov. 27, 1945 |
| 2,461,515 | Bronwell | Feb. 15, 1949 |